United States Patent [19]
Elliot
[11] 3,829,622
[45] Aug. 13, 1974

[54] VIDEO DISC PLAYER WITH VARIABLY BIASED PNEUMATIC HEAD

[75] Inventor: James E. Elliot, Los Angeles, Calif.
[73] Assignee: MCA Disco-Vision, Inc., Universal City, Calif.

[22] Filed: Oct. 24, 1972
[21] Appl. No.: 299,893

[52] U.S. Cl. .......................... 179/100.3 V, 360/103
[51] Int. Cl. .......................... G11b 5/60, G11b 7/08
[58] Field of Search 179/100.2 P, 100.3 Z, 100.3 V, 179/100.3 M, 100.3 E, 100.30 L, 100.2 CA; 178/6.7 A; 274/4 H; 340/174.1 E

[56] References Cited
UNITED STATES PATENTS

| | | | |
|---|---|---|---|
| 2,838,683 | 6/1958 | Munro | 250/227 |
| 3,381,085 | 4/1968 | Johnson | 178/6.7 A |
| 3,381,086 | 4/1968 | Moss | 178/6.7 A |
| 3,530,258 | 9/1970 | Gregg | 179/100.3 V |
| 3,573,768 | 4/1971 | Harris | 179/100.2 P |
| 3,673,412 | 6/1972 | Olson | 179/100.3 V |
| 3,715,523 | 2/1973 | Rousseau | 179/100.2 CA |
| 3,715,524 | 2/1973 | Adler | 179/100.3 V |
| 3,745,543 | 7/1973 | King | 179/100.2 P |

*Primary Examiner*—Bernard Konick
*Assistant Examiner*—Alan Faber
*Attorney, Agent, or Firm*—Marvin H. Kleinberg

[57] ABSTRACT

A video signal playback device derives video signals from a track on a video disc using a light source and an optical path to a lens system which is supported by an air bearing at a predetermined spacing from the surface of the disc. The optical path includes a mirror which is articulated for rotational motion about an axis which shifts the point of impingement of the transmitted light beam upon the disc in the radial direction. The returned beam is directed to a single photosensitive pick-up which, provides input signals to a circuit which generates a "fine" servo control signal to drive the articulated mirror. The air bearing member includes apparatus providing a bias force that varies with the radial displacement of the transducer assembly relative to the disc center.

4 Claims, 8 Drawing Figures

PATENTED AUG 13 1974 3,829,622

SHEET 1 OF 2

VIDEO DISC PLAYER WITH VARIABLY BIASED PNEUMATIC HEAD

BACKGROUND OF THE INVENTION

Field of the Invention

Systems have heretofore been developed for reproducing signals at video frequencies from information recorded on discs, tapes, or other media. Such systems have utilized, among other things, optical recordings upon photosensitive discs, electron beam recording on thermo plastic surfaces and, in prior patents assigned to the assignee of the present invention, systems utilizing a rotating disc which is responsive to impinging radiation to reflect or transmit radiation corresponding to and representative of the information stored on the surface of the disc.

For example, in U.S. Pat. No. 3,530,258, issued to David Paul Gregg and Keith O. Johnson on Sept. 22, 1970, there was shown and described a system in which a video signal transducer included a servo controlled pair of flexible, fibre optic elements. An air bearing supported an objective lens system. A light source of radiant energy was positioned below the disc and the transducer was responsive to transmitted light.

Other patents have shown the use of a radiant source which directed an energy beam to the surface of the disc and provided a transducer that was responsive to reflected energy. One of the major problems to the encountered in the recording and reproduction of video information, arises directly from a consideration of the energy levels involved in such a process and the restraints imposed by the considerations of size, weight and operating conditions.

To be commercially desirable as a home instrument, the system should be able to store and reproduce a "program" of at least 15 to 30 minutes in length. The record disc should be of an easily handled size, comparable to the phonograph records currently in use. If the playback turntable was operated at 1,800 rpm, some 54,000 revolutions would provide 30 minutes of playback. Assuming a 1 micron track width and 1 micron spacing between adjacent tracks, a circular band approximately 4.25 inches wide is required. Assuming that the smallest radius at which information can be stored is approximately 3 inches, the resultant disc is about 15 inches in diameter. The duration of the program or the speed of the turntable can change the dimensions of the recorded area, as can the width of the individual track and the spacing between adjacent tracks.

Assuming that the video information has been recorded in some digital fashion, the presence or absence of a signal can be detected at an appropriate information rate. If the width of the track is approximately 1 micron, and that the space between adjacent tracks is also 1 micron, the quantity of energy necessary to impart information from the disc can be determined. It is necessary to provide sufficient radiant energy to "illuminate" a "spot" of approximately 1 micron in diameter and, at the same time, provide sufficient radiant energy at the detector, so that the "presence" or "absence" of a signal can be distinguished.

It has been discovered, in attempting to utilize the transmitted radiation techniques of the prior art, that the provision of an inordinately large amount of radiation into the system is required in order to "transmit" a sufficiently useful increment of energy for detection through the record. It has also been determined that a substantial magnification is required to enable a state-of-the-art transducer to respond to a 1 micron diameter radiant spot.

If a light source illuminates the entire field which can be scanned by the detector under control of the servo system, it will be seen that an extraordinary light intensity must be provided before the light transmitted through or reflected from the disc will be of sufficient intensity to register upon the photosensitive device.

In a preferred embodiment of the present invention, an articulated mirror is utilized in conjunction with a second mirror to provide multiple reflecting paths. With a plurality of reflections, assuming the use of a highly collimated source, small amounts of mirror motion are necessary to move the point of impingement of the radiant spot upon the disc. Moreover, a plurality of reflections provides a longer optical path which enables the use of longer focal-length lenses, for directing a radiant spot to the disc and for focusing the image of the reflected spot upon the photosensitive transducer.

An important aspect of the present invention is the ability to direct the illuminating radiation to a particular spot and to return the information from the spot thus illuminated to a detector system. The prior art has suggested the use of a pair of transducers in conjunction with a summing amplifier to provide signal information and a differential amplifier to provide feedback servo information for error correction. However, given the limitations of the extremely low radiation levels, the diffraction limited characteristics of the image and the extreme sensitivity of the system to noise and vibration, such an approach is not entirely satisfactory. A difference "curve following" technique described in the patent to W. D. Munro, U.S. Pat. No. 2,838,683, issued June 10, 1958, has suggested an alternative solution.

In the preferred embodiment therefore, a single photosensitive pickup is used as one input to a differential amplifier, and a second input is provided from a fixed bias source. The bias is adjusted to balance the input of the photodetector when it is illuminated by the reflected spot that is approximately half way into the information track for example on the periphery side of the track. If the intensity of the radiation upon the detector increases in a system where the track is "darker" than the band between "tracks," then a servo signal is developed to drive the mirror in a first direction, tending to move the spot toward the track and toward the center. Similarly, if the radiation decreases, the relatively higher magnitude of the bias causes an error signal to be generated which moves the mirror and the "spot" in a respectively opposite direction, away from the track and toward the periphery.

Since, in the preferred embodiment, one revolution of the disc represents one "frame" of the T.V. picture, an error in tracking, where the track is "lost," merely results in either the skipping or the repeating of a frame, both of which are undetectable by the human observer.

In alternative embodiments, it is possible to use the earlier prior art technique of the photodetector pair.

A second, articulated mirror may be provided which rotates in a second direction, orthogonal to the direction used for the radial tracking of the image. Such tracking may be considered to be in the circumferential direction and would aid in the synchronization and timing of the recorded information with respect to the timing frequencies generated in the reproducer circuits. As is known, television circuits, and especially color television circuits, require extremely accurate time synchronization in order to maintain color fidelity. Therefore, any error in synchronism between the local oscillator of the reproduction apparatus and the timing information recorded on the disc, may be resolved and eliminated through the use of mirror motion in the second direction.

It has been found that any errors resulting from eccentricity of the disc can be simply corrected. It will be noted that the tracking circuit which maintains the radiant spot on the appropriate spiral track will undergo some periodic signal fluctuation that is related to eccentricity. It can then be shown that the change in instantaneous velocity in the circumferential direction also changes in substantially similar fashion, but lags by one-quarter revolution of the disc. Therefore, it is possible either to sense the velocity changes from the recorded timing information and from this derive a correcting signal to drive the tracking servos, or to sense the eccentricity from the tracking servo and use that signal with an appropriate phase shift to drive the "timing" servo to correct for velocity changes due to eccentricity. In an alternative embodiment, a single axis articulated mirror corrects for tracking and electronic circuits compensate for timing errors.

In yet another improvement, it has been discovered that the bias force need to maintain the air bearing that supports the objective lens at a predetermined distance from the disc surface varies as a function of the surface velocity of the disc. Since the surface velocity is directly related to the relative radial location of the air bearing, a simple mechanical cam assembly is employed to modify the bias force on the air bearing as a function of radial location of the playback assembly.

Accordingly, it is an object of the present invention to provide an improved playback assembly for a disc upon which video information has been recorded.

It is yet another object of the invention to provide an improved tracking circuit for optically scanning a video disc.

It is yet another object of the invention to provide an improved scanning assembly for video disc which includes an optical system for directing a radiant energy spot to the disc and to detect reflected radiant energy therefrom and to direct this reflected energy to a photosensitive transducer.

It is yet an additional object of the invention to provide an improved articulated mirror assembly in the optical path between a light source and the surface of the video disc, which mirror assembly can be used to direct the location of the spot relative to the disc surface within certain limits.

It is yet an additional object of the invention to provide an articulated mirror assembly in an optical path which permits, with small incremental motions of the mirror, to vary widely the location of a transmitted spot of radiant energy on the surface of the disc and, at the same time, transmit to a detector system the returned radiant energy.

It is yet a different object of the invention to provide a video disc playback assembly which directs a radiant spot to the surface of the disc and directs the returning radiation to a photosensitive detector and which detects returning radiation from the disc surface.

It is yet an additional object of the invention to provide a radiation detector for a video disc playback assembly which applies an input to a differential amplifier, the second input to which is a fixed bias, for generating an error signal to control the optical system directing a radiant spot to the disc surface and returning a reflected spot therefrom to the detector.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration only and are not intended as a definition of the limits of the invention.

DESCRIPTION OF THE PREFERRED EMBODIMENTS

Figure 1:
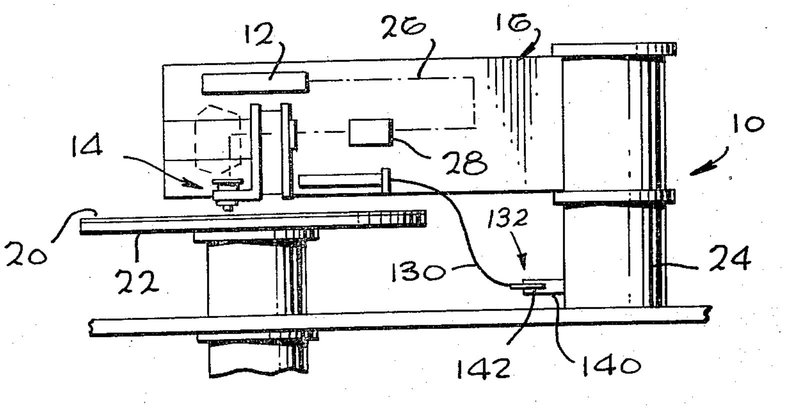
FIG. 1 is an idealized side view of a playback assembly according to the present invention.

Turning first to FIG. 1, there is shown, in side view, a playback assembly 10 suitable for use in the present invention. The playback assembly 10 includes a laser element 12 which moves with the playback assembly 10. It is, however, within the state-of-the-art to provide a stationary laser which is coupled optically to the movable assembly 10. Preferably, the laser 12 provides coherent, polarized light. A read head 14 is mounted in arm 16 of the playback assembly 10.

A video disc 20, which has video information recorded upon it is mounted on a turntable 22, which is adapted to rotate the disc 20 at a relatively high speed. In the preferred embodiment, the turntable speed is set at 1,800 rpm.

Suitable video discs have been described and claimed in the patents to Gregg, Johnson, supra.

The playback assembly 10 is mounted on a rotatable element 24 which, in view of FIG. 1, translates the reading head in the radial direction relative to the disc 20 and in an arc that is generally orthogonal to the plane of the drawing.

The laser 12 generates a reading beam 26 which generally passes from the laser 12 through an optical system to the playback head 14. The beam is then directed to the surface of the disc 20 and returns through the playback head 14 along the same optical path until a read assembly 28 is encountered. The read assembly 28 is mounted on the arm 16.

In operation, the laser directs a reading light beam 26 to the surface of the disc 20 through the optical system. The information recorded upon the disc interacts with the impinging beam and a reflected beam is produced which contains the recorded information. The reflected light beam is returned to the optical system which "analyzes" the return beam to determine whether the beam is properly tracking the signal channel.

If the electronics determine that the laser spot is not being directed to a predetermined area of the information channel, appropriate servo signals are derived which, when applied to the read head 14, cause the point of impingement of the laser beam to shift in the radial direction to retain alignment with the track that is being read.

In an alternative embodiment, the driver for the rotatable element 24 for the playback assembly 10 can also be controlled by the servo signals which changes the position of the laser spot. In yet other embodiments, a motor can be coupled to the turntable driver to provide a predetermined increment of radial motion for each revolution of the turntable 22. In any case, the playback head 10 can be made to track the information channel recorded on the disc 20 with a "coarse" adjustment being applied to the driver of the rotatable element and a "fine" adjustment being applied to an articulated mirror, described in greater detail below. A cam and follower assembly 132, described in greater detail in conjunction with FIG. 7 below, is located on the rotatable element 24 and communicates with the arm 16 through a flexible cable 130.

Figures 2, 3:
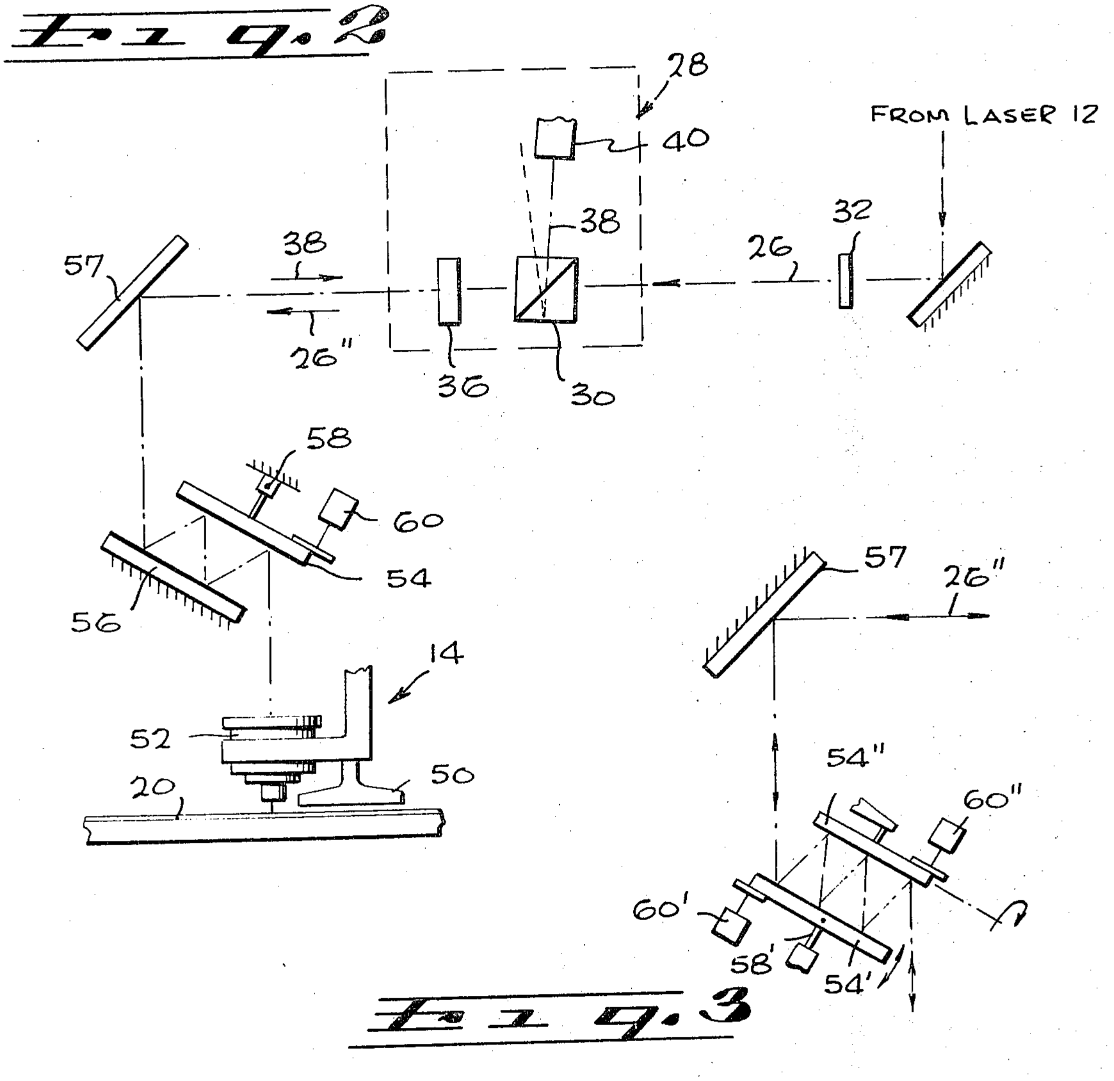
FIG. 2 is a more detailed block diagram of the elements in the optical playback system.
FIG. 3 is an idealized view of an alternative articulated mirror assembly.

Turning next to FIG. 2, there is shown a diagram of the elements of the reading system. The reading laser beam 26 is applied to a beam splitting prism 30. The prism 30 is rotated slightly with respect to the optical path. A lens 32 is provided to better form the beam 26 at the surface 20 and to optimize the resolving power of the system. The transmitted portion of the beam 26 is applied through a quarter wave plate 36 and is then directed through the reading head 14 to the disc 20.

A returning beam 38 containing the information from the disc 20 follows substantially the identical path. At the quarter wave plate 36, the returning beam is now given an additional quarter wave shift for a total polarization of one-half wavelength. The returning beam 38 reaches the beam splitter 30 and is reflected therefrom to a suitable optical system 40. Light from the laser 12 that is initially reflected in the prism 30 and re-reflected from the base of the prism will, due to the slight rotation of the prism 30, be aimed at a point that wholly misses the detector 40. Moreover, the cumulative effect of the quarter wave plate which polarizes the returning beam by $\lambda/2$ substantially attenuates any transmitted component. What is transmitted is cross polarized with respect to the laser 12.

The read 14 includes a fluid-bearing member 50 which is adjacent to and supportive of a microscope objective lens 52. A limited amount of vertical adjustment is available in the objective lens 52. Directing the illumination to the objective lens 52 is an articulated mirror 54 which is mounted adjacent to and cooperates with a second or fixed mirror 56 that is substantially parallel with the articulated mirror 54. The fixed mirror receives the reading beam 26 and directs it to the articulated mirror 54.

The reading beam 26 undergoes at least one reflection from the particulated mirror 54 before the beam is applied to the objective lens 52. Two such reflections are illustrated in the embodiment of FIG. 2. Similarly, the beam path is such that a reflected beam 38 returning from the surface of the disc 20 would also undergo two reflections from the articulated mirror 54 and two reflections from the fixed mirror 56 before proceeding into the optical path including an additional fixed mirror 57 which ultimately leads to the read assembly 28.

In the embodiment illustrated, the articulated mirror 54 is mounted on a point pivot 58 that is centrally located with respect to the mirror 54. The mirror 54 may have an oblong shape with the long axis in the plane of the drawing and the short axis orthogonal to the plane of the drawing. As shown, a mirror driver 60 is connected to one end of the mirror 54 and is operable to impart motion about the central pivot 58.

If the driver 60 rotates the mirror 54 in the clockwise direction, as viewed in FIG. 2, the point of impingement of the read beam 26 will be shifted to the left. This would represent a deflection of the beam in a first radial direction. If the driver 58 rotates the mirror 54 in the counter-clockwise direction, then the point of impingement of the transmitted beam 26 will be shifted to the right, as seen in FIG. 2, or in a second, opposite radial direction.

It will be obvious that the reflected beam 38 and the reading beam 26 trace identical paths between the surface of the disc 20 and the beam splitter 30. The articulated mirror 54 serves to "steer" the reading spot to a desired location and then "reads" only the illuminated area, transmitting that information back to the read assembly 28.

In alternative embodiments, the articulated mirror 54 and the stationary mirror 56 can be adjusted and repositioned to provide a greater plurality of reflections between the two mirrors before the beam continues either to or from the disc surface 20. In such an arrangement, the magnitude of mirror deflection required to steer the reading spot appropriately can be greatly reduced. The driver 60 therefore, need only impart small, incremental motions to the articulated mirror 54.

In an alternative embodiment, as shown in FIG. 3, a first articulated mirror 54' is provided which is mounted on a central pivot member 58', and is driven about an axis orthogonal to the plane ot the FIGURE and in the clockwise and counterclockwise direction by a first driver 60' that is coupled to the mirror 54' at the end of a long axis.

A second driver 60'' is coupled to one end of a third mirror 54'' for imparting rotational motion to the third mirror 54'' about the long axis that is in the plane of the FIGURE.

In operation, the first driver 60' permits translation of the beams in the "radial" direction to permit "fine" tracking of the information channel. The second driver 60'' is used to translate the beam in the circumferential direction, to provide time synchronization, if desired, and to compensate for eccentricity.

In other embodiments, the problem of time synchronization can be handled mathematically, as a set in the process of electronically compensating for eccentricity of the disc 20 and in such embodiments, only the single articulated mirror is used.

Figure 4:
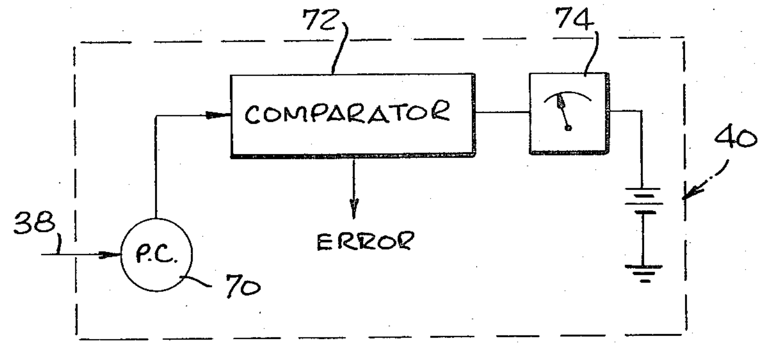
FIG. 4 is a block diagram of a suitable detector and tracking circuit of the prior art.

Turning next to FIG. 4, there is shown a preferred embodiment of the optical detector assembly 40 which utilizes some of the electronics of the Munro patent, supra. As shown in FIG. 4, the returned optical image 38 is directed to impinge upon a photocell 70 when a channel is being tracked properly, with the spot on the outer half of the track, a predetermined output signal is generated. The output of the photocell 70 is applied to a comparator 72. An adjustable bias 74 is applied to the other input of the comparator 72 and is adjusted to provide a null when the predetermined output signal is being applied. The error signals resulting from drift can be integrated, and the output of the integrator can be applied to an appropriate circuit to urge the movable playback assembly 10 relative to the center of the disc 20. The error signal is also used to apply a signal directly to the mirror driver 60 of FIG. 2 to urge the beam to follow the track.

If, however, the track is not being followed properly, depending, of course, upon the characteristics of the disc surface, a condition will be presented in which the energy impinging upon the photocell 70 will be different than the bias provided by bias circuit 74, and accordingly, the error signal of appropriate polarity will be provided to correct the position of the light spot relative to the information channel. The integrator output then is applied to the movable playback assembly 10, and if the bias signal is greater, a forcing function is generated tending to send the spot toward the periphery of the disc. If the received signal is greater, the spot is directed to the center of the disc. As the spot follows the spiral track properly, the differential output tends towards the null. For this example, it is assumed that an appropriate mechanism drives the rotatable element 24 so that the arm moves in the radial direction at a predetermined rate. The output of the integrator would then provide a correcting signal tending to correct the rate at which the arm is moving toward the center. Alternatively, if the arm is to be driven entirely by the output of the integrator, the convention observed is substantially immaterial. If the bias signal being greater urges the spot toward the center of the disc, then the spot will follow the track on the "inner" edge. On the other hand, if a greater bias signal drives the spot toward the periphery, then the spot will follow the outer edge of the track. In either case, the error signal, when integrated, will provide an appropriate forcing function to the arm driver circuits so that the arm generally follows the track.

Figure 5:
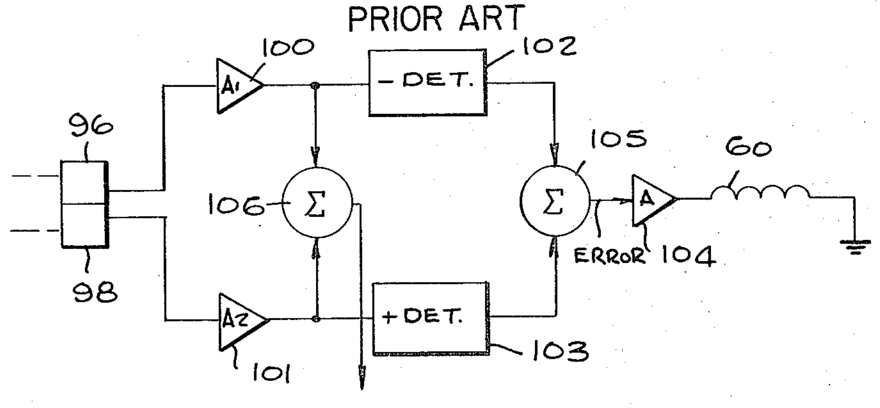
FIG. 5 PRIOR ART
FIG. 5 is a block diagram of an optical detector of the prior art suitable for use in the present invention.

In FIG. 5, there is illustrated the prior art optical detector electronics utilized and shown as FIG. 10 in the previously issued Gregg, et al., U.S. Pat. No. 3,530,258, assigned to the assignee of the present invention. For convenience, the same reference numbers are used in Gregg, et al. and herein. A pair of photo detectors 96, 98 are employed which, in combination, provide an additive information signal and, when differenced, an error signal which controls servo elements that redirect the reading elements. As applied to the present invention, the radial error signal could be applied to either of the drivers 60, 60′ of the articulated mirror assemblies of FIGS. 2 and 3, respectively.

As shown in FIG. 5, a dual photo detector has two sections 96, 98 whose outputs are applied to respective amplifiers 100, 101. The outputs of the amplifiers 100, 101 are summed in a summing network 106. The output from the summing network represents the sum signal from the two photo detector sections 96, 98 and constitutes the modulated signal output of the transducer.

The signal amplitude from the first photo detector section is applied to a detector 102, and this detector produces a negative unidirectional signal representative thereof. The signal amplitude from the second photo detector section is applied to a detector 103, and the latter detector produces a negative unidirectional signal in response thereto. The two signals are added algebraically in a summing network 105 which produces an error signal.

In the present example, the resulting error signal is amplified in an amplifier 104, and it is applied to the circuits of FIG. 3 and driver 60′. The error signal applied to the driver 60′ causes the mirror 54′ to shift the beams in a radial direction with respect to the disc 20, as explained above. The direction and amount of the shift depends on the polarity and amplitude of the error signal, so as to maintain the spot in perfect registry with the recording track on the record 20.

The output signal from the summing network 106 is applied to appropriate video detection and reproducing circuitry such as is illustrated in FIGS. 17 and 18 of Gregg, et al., supra, and described therein.

The DC component of the output of the amplifier 104, when properly processed, may be used in several ways to move the pick-up arm of FIG. 1 across the disc 20 at very nearly the rate which makes the signal approach zero. One method is to integrate this component over short intervals until it reaches a predetermined value, at which it triggers a solenoid. This solenoid, in turn, actuates a light-duty friction ratchet which then turns the pick-up arm through a very small angle, as is taught in Gregg, et al., supra.

Another method, also suggested in Gregg, et al., supra is to use an inexpensive electric clock movement with a reduction gear to drive the arm continuously across the disc at a rate just slightly above 2 microns for each one thirty second or revolution of the disc. In this case, the integrated signal of the first method is used to interrupt the motor voltage occasionally. To assist the process, the arm 16 of FIG. 1 may be biased slightly towards the center of the disc 20.

Figures 6, 8:
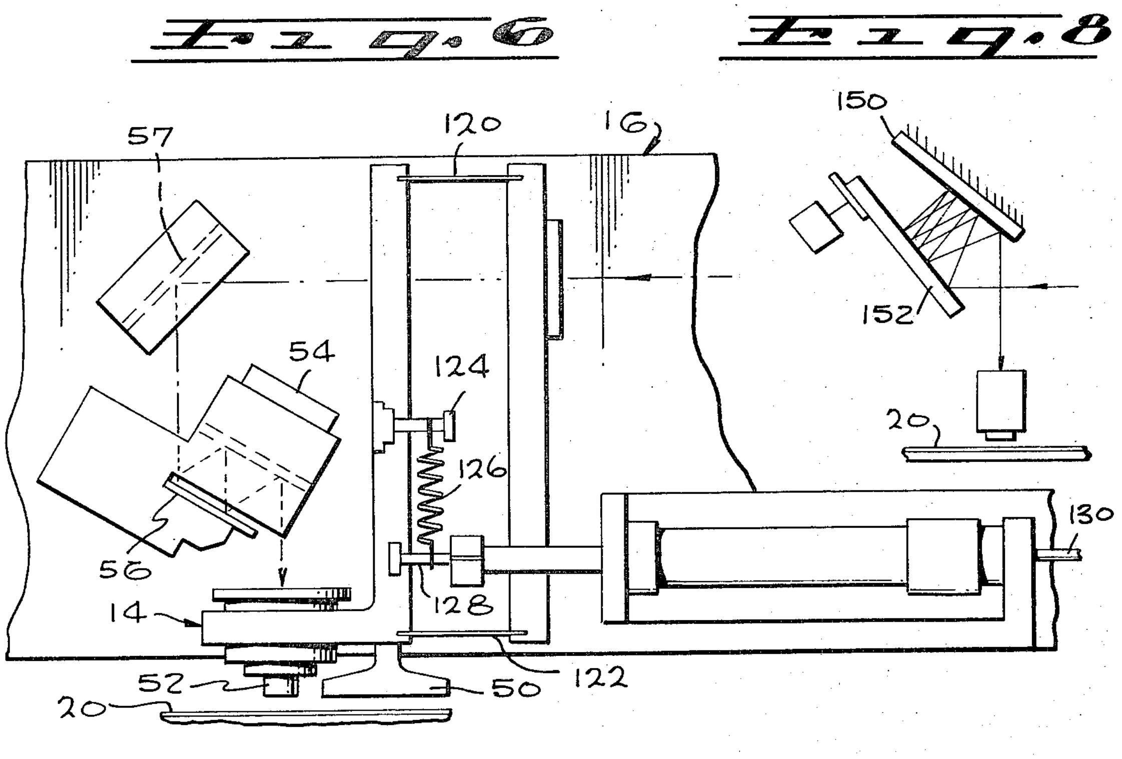
FIG. 6 is an enlarged side view of the optical head and air bearing assembly.
FIG. 8 is a side view of another alternative articulated mirror arrangement useful in the system of the present invention.

In FIG. 6, there is shown an enlarged side view of the lens and air bearing assembly of the playback head 14. The movable arm 16 connects to the playback head 14 through a pair of parallel leaf springs 120, 122. The spring force of the leaf springs 120, 122 is generally insufficient to maintain the springs in the horizontal position with the playback head 14 unsupported by the fluid bearing that is generated by the rotating disc 20. Within the read head 14 is the fluid bearing member 50 and the microscope type objective lens 52. Also contained in the read head 14 are the fixed and articulated mirrors 54, 56, 57 necessary to direct the beam of light from the source to the lens 52 and back from the surface of the disc 20.

A support post 124 extends outward of the read head 14 toward the inner end of the arm 16. Mounted to this support post 124 in a bias spring 126, the other end of which is fastened to a lever 128. The lever 128 is coupled to the arm 16 and, through a flexible cable 130, connects to a cam and follower assembly 132, to be described in connection with FIG. 7, below.

Also included, but not described in detail, are appropriate interlocking solenoid assemblies operating in conjunction with the cam and follower assembly to maintin the read head 14 out of contact with the disc 20 as the arm 16 swings out of engagement with the disc 20, and which act to prevent damage if, for any reason, the disc 20 should slow appreciably while being tracked by the read head 14.

The bias spring 126, when compressed, acts like a solid rod, enabling the lever 128 to directly cam the read head 14 upward and away from the disc 20, if this configuration is desired. Alternatively, when the read head 14 is in position over the disc, the lever 128 rotates in the opposite direction, relieving the compression on the spring 126. Under normal circumstances, the weight of the read head 14 is supported by the fluid bearing member 50 on the disc, thereby enabling the leaf springs 120, 122 to be substantially parallel and horizontal.

According to the present invention, an additional bias is provided through the use of the bias spring 126 to maintain a substantially constant separation between the read head 14 and the fluid bearing member 50 and the surface of the disc 20. The relative surface velocity changes as the moving arm 16 progresses toward the center of the disc and the fluid bearing is less able to support the read head. Therefore, at the outset, the lever 128 is rotated in the downward direction, applying a stretch to the spring 126 which, in turn, imparts a downward force to the support arm 124, thereby increasing the bias on the fluid bearing 50 while the fluid pressure is at its greatest.

As the arm 16 moves inwardly of the disc 20 and the surface velocity is reduced, a cam follower arrangement gradually rotates the lever 128 in the upward direction, reducing the tension of the spring 126, thereby lessening the bias on the read head 14. By selecting an appropriate cam contour, the bias on the fluid bearing 50 can be maintained at an optimum value for constant separation from the disc 20 for the surface velocity of the disc at any radial location.

Figure 7:
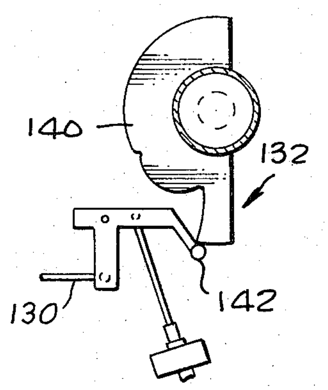
FIG. 7 is a top idealized view of a cam and follower assembly for controlling the bias on the air bearing assembly.

Turning now to FIG. 7, there is shown one form of cam and follower assembly 132 that can drive the lever 128 through the flexible cable 130 (also shown in FIG. 1). A cam 140 is cut so that at the outermost position of the arm 16, a follower 142 rests on a high lobe which maintains the head 14 in an "up" position, safely out of contact with the edge of the rotating disc 20.

As the arm 16 tracks inwardly, the follower 142 immediately proceeds to the innermost point on the cam 140 surface, applying maximum bias to the read head 14. As the arm then continues inwardly in the radial direction, the follower 142 gradually rides outwardly from the center of the cam 140, thereby reducing the bias forces on the read head 14.

It is clear that techniques are readily available for transmitting simple mechanical motion from the cam follower assembly 132 to the arm 16, and the specific details are unnecessary in the present application.

In FIG. 8, there is shown an alternative configuration for the articulated mirror assembly that is mounted on the read head 14. In this alternative embodiment, a fixed mirror 150 and an articulated mirror 152 are arranged on converging planes. An incoming beam in the horizontal direction impinges upon the articulated mirror 152, and through multiple reflection between the fixed mirror 150 and the articulated mirror 152, the beam is ultimately rotated through 90° and is directed downward into the reading assembly. Similarly, the returning beam retraces the same path. The mirror 152 is articulated to rotate about an axis that is in the plane of the drawing to deflect the transmitted beam in a direction that is perpendicular to the plane of the drawing.

The angle of incidence of the mirror 150 and the angle of convergence between the mirrors 150 and 152 are controlled so that the incoming beam makes a plurality of reflections off of the two mirrors before being directed into the disc. Moreover, since the pair of mirrors, in addition to providing a "folded" light path, also rotates the beam through 90°, a separate 45° mirror can be omitted, thereby increasing the intensity of available light to the disc. Of course, this would permit at least one extra reflection between the mirror pair without in any way degrading the quality of the light beam. The same number of internal reflections as in the embodiment of FIG. 2 could be employed with less light loss in the mirror system.

Thus, there has been shown an improved video disc reading assembly which steers the illuminating radiation to the information track on the surface of the disc and steers the return signal from the track to an optical detector. An articulated mirror enables the steering of both the transmitted and the returned light beam.

An improved optical detector is utilized in combination with a fixed bias source so that a single detector provides both the information signal and the servo signals necessary to track the information channel.

A novel air bearing assembly has also been disclosed, which enables a microscope lens to travel at a fixed distance above the disc supported on a fluid bearing, and means are provided to impart a variable bias to the fluid bearing as a function of relative velocity between the disc and the bearing member.

What is claimed as new is:

1. In a video disc playback system including a turntable adapted to receive a video disc and a player arm radially movable relative to the disc, the combination comprising:

a transducer head, yieldably mounted on the player arm and adapted to be maintained in close proximity to the video disc surface;

fluid bearing support means coupled to said transducer head and operable to create a fluid bearing between said head and a rotating video disc; and adjustable bias means for applying a varying force to said head in the direction of the disc to achieve a predetermined spacing between said head and the disc substantially independent of radial position of said head.

2. Apparatus of claim 1 above wherein said transducer head is mounted to the arm by at least a leaf spring, said leaf spring being insufficient to support the weight of said head.

3. Apparatus of claim 1 above further including bias control means coupled to the arm and operable in response to player arm radial location for varying the applied force in accordance therewith to compensate for different surface velocities at different radii of the disc.

4. Apparatus of claim 3 above, wherein said adjustable bias means include a spring coupled to said head and said bias control means include a cam and follower connected to the player arm and coupled to said spring for varying the bias imparted by the spring as a function of follower position on said cam, determined by player arm location relative to the center of the disc.

* * * * *